United States Patent [19]

Edwards

[11] Patent Number: 4,992,050
[45] Date of Patent: Feb. 12, 1991

[54] CONSUMER COLOR REFERENCE KIT

[76] Inventor: Diane M. Edwards, 3000 Dorf Dr., Moraine, Ohio 45418

[21] Appl. No.: 362,590

[22] Filed: Jun. 7, 1989

[51] Int. Cl.$^5$ .............................................. G09B 19/00
[52] U.S. Cl. ........................................ 434/98; 434/81; 206/575; 206/44.11; 206/37; 206/38; 206/44 R
[58] Field of Search ................... 434/98, 103, 84, 99, 434/100, 81; 206/579, 37, 44 R, 45.31, 44.11, 44 B, 575, 38

[56] References Cited

U.S. PATENT DOCUMENTS

| | | | |
|---|---|---|---|
| 750,620 | 1/1904 | Dohse | 434/98 |
| 2,007,264 | 7/1935 | Allen | 434/98 |
| 2,354,493 | 7/1944 | Adams | 434/98 |
| 3,000,113 | 9/1961 | Olson | 434/98 |
| 3,434,227 | 3/1969 | Brown | 434/98 |
| 4,449,629 | 5/1984 | Barrieau | 206/44 R |
| 4,457,718 | 7/1984 | Lerner | 434/98 |
| 4,629,428 | 12/1986 | Phillips | 434/98 |
| 4,685,570 | 8/1987 | Medow | 206/579 |
| 4,741,372 | 5/1988 | Santilli | 206/37 X |
| 4,749,082 | 6/1988 | Gardiner et al. | 206/45.31 X |
| 4,795,029 | 1/1989 | Campbell et al. | 206/45.31 X |

*Primary Examiner*—Richard J. Apley
*Assistant Examiner*—Jennifer L. Doyle
*Attorney, Agent, or Firm*—Joseph Patrick Burke

[57] ABSTRACT

The consumer color reference kit of this invention is based on the four basic known process printing colors, viz., magenta (red), yellow, cyan (blue) and black, and contains nine major sheets each of which is dividable readily by the user into four minor cards. Each mirror card contains eight separate, different, distinct readily visually discernable color specimens. One of the major sheets, the primary major sheet, contains four shades (tints) of each of eight major colors or color groups, viz., red, orange, yellow, green, blue, purple, brown and gray.

The remaining eight major color sheets are referred to as secondary and each secondary major sheet contains thirty-two different, distinct readily discernable shades (tints) of the same eight previously mentioned major colors/color groups.

On one side of each of the nine major sheets, the color speciments are glossy (smooth). On the other side of each such major sheet, and in a position corresponding, respectively, with the color speciment on the reverse side thereof, the color specimens are matte (dull) finish.

The consumer color reference kit of this invention preferably contains one or more transparent, plastic holders of sufficient size to include and enclose one or more minor cards. Also preferably a clear, transparent, plastic enclosure, envelope or bag of the readily top sealbe type, e.g., one which can be sealed simply by applying finger pressure, encloses the entire consumer color reference kit of this invention.

11 Claims, 3 Drawing Sheets

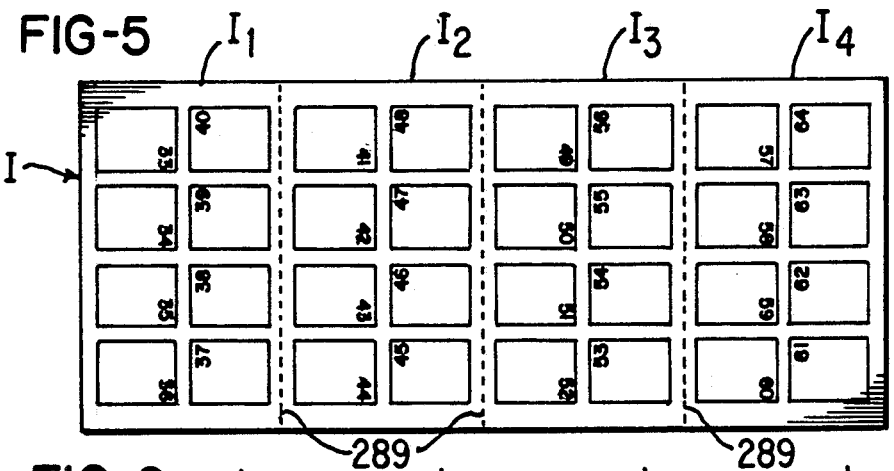
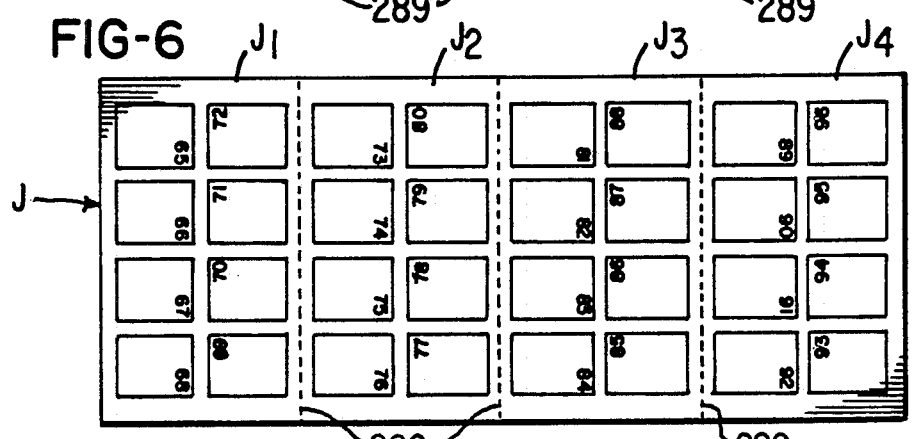
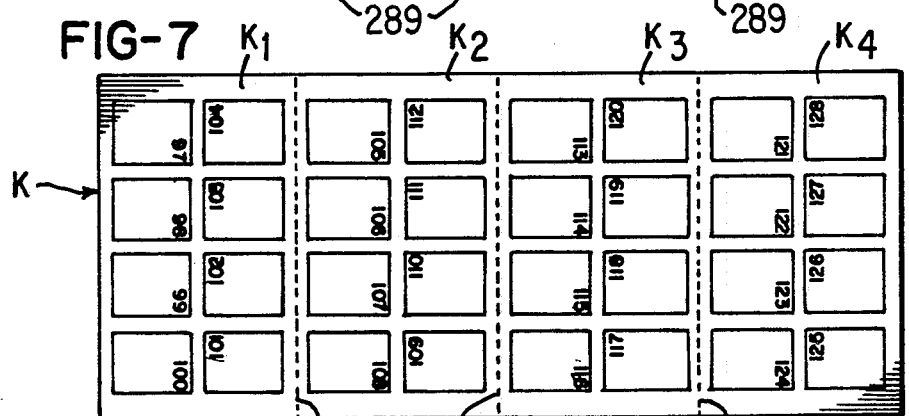
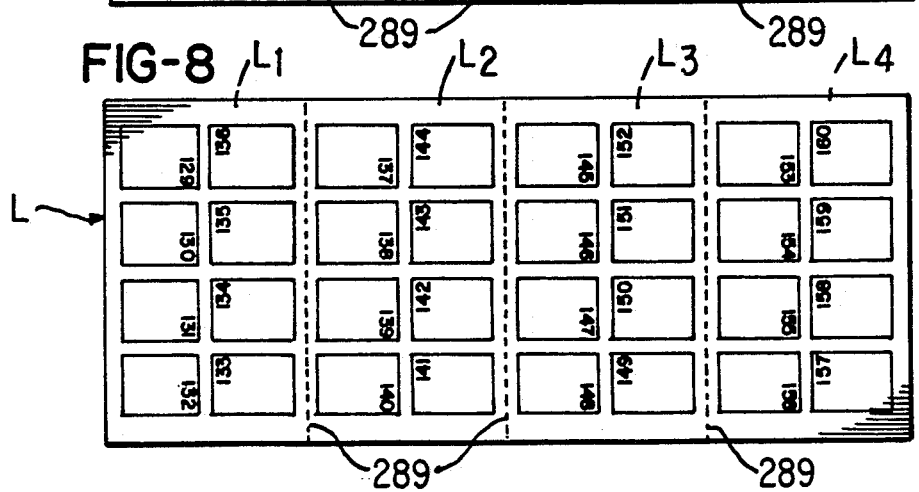

FIG-9, FIG-10, FIG-11, FIG-12

CONSUMER COLOR REFERENCE KIT

BRIEF DESCRIPTION OF THE INVENTION

The present invention is directed to an inexpensive, highly portable, consumer color reference kit enabling the user to match or coordinate closely and compatibly the color of an item located at one place, e.g., at home, with that of another item located elsewhere, e.g., in a store, simply by using only several simple visual color comparisons without having to bring the item desired to be color matched or coordinated from its location. The present invention enables the user to communicate a specific color shade/tint with another having this kit so as to indicate and coordinate color requirements or wants via the associated differentiating indicia, e.g., numbers appearing in conjunction with each color shade/tint.

The consumer color reference kit of this invention is based on the four basic known process printing colors, viz., magenta (red), yellow, cyan (blue) and black, and comprises a card set which contains, but is not necessarily limited to, nine major sheets, each of which is dividable (separable) easily by the user into four minor cards, e.g., preferably by scoring lines, perforation, etc. Each minor card contains eight separate, different, distinct and readily visually discernible color specimens. One of the nine major sheets is referred to primary, because it is used in the initial visual color comparison step, and contains four shades (tints) of each of eight major colors or color groups, viz., red, orange, yellow, green, blue, purple, brown and gray.

The remaining eight major color sheets are referred to as secondary, because each can be used in the subsequent visual color comparison step(s) and each secondary, major color sheet contains thirty-two, different, readily discernible shades (tints) of one of the same eight previously mentioned major colors/color groups.

The present invention offers the user a wide spectrum of 288 shades (tints) of colors plus or minus in both glossy and dull (matte) finishes, but is not necessarily limited to this number of shades/tints, for a visual total of 576, plus or minus, variations of color appearances. However, the only comparison card which the user needs to bring to the store, or communicate to another through the numbering system, for the final color matching or comparison for each item desired to be purchased, is a single, secondary minor card approximately the size of a business card.

BACKGROUND OF THE INVENTION AND PRIOR ART

The present invention seeks to enable the person using the consumer color reference kit to match, color coordinate or reference at least one item located at one location with another item, e.g., desired to be purchased at a store, which is located elsewhere, without having to bring the item desired to be matched from home to the store, as this can be inconvenient and sometimes well near impossible, for example, in cases where one wants to purchase wallpaper for a bathroom which will match or be color coordinated and compatible with towels, curtains and/or wall hangings.

In the past, for example, if one were to purchase a new tie which would match or be color compatible with a shirt, sport jacket and/or slacks, it was necessary to bring the item desired to be matched from home to the store to accomplish this by visual comparison. Not only is this cumbersome and bothersome, but also sometimes required passing through store security and getting a permit to bring the item desired to be matched/color coordinated into a given area of the department store. Similar problems can be encountered in trying to color coordinate scarves, jewelry, blouses, etc., with skirts, dresses and other wardrobe items. The present invention also enables person to person verbal communication of color description through specific indicia (number) reference which eliminates unclear and inaccurate memory accounts of a given color description/color comparison.

A variety of prospective solutions to color communication have been proposed in the prior art including those patents discussed herein, but in the main, these proposed solutions were directed to the printing industry for color communication from designer to printer and seeking improved results in the final printed product. These prior art color charts/masks are of little, if any, aid to the average consumer. They are designed and developed for those within the field of printing, are complicated and incorporate terminology and technology beyond the ready understanding of most typically average consumers.

U.S. Pat. No. 4,629,428 issued to Gordon L. Phillips relates to color printing process and equipment utilized therein to assist the designers in creating color prints via the use of three basic process printing colors, cyan, yellow and magenta with black being optional. This Phillips invention assists the color printer in color reproduction control. The Phillips invention is basically a reference chart containing detailed instructions for mixing of three basic printing colors in varying proportions to produce colors on the chart via use of specific screen values. The color printing process equipment of Phillips include three large master screen tint charts and large sheets with colors printed on them (on various surfaces, e.g., matte paper, art paper, laminated paper) for cutting out to create visual effects so that a designer can describe to his printer, the designer's color choices. The Phillips invention identifies types of dot and pattern and proper screen values to control dot shrinkage and dot gain. The Phillips invention is stated to eliminate screen or dot problems called moire pattern and gives the artist/designer a common denominator of color choice for reproduction. Phillips is concerned predominately with preestablished screen values and shapes and angles of dots.

U.S. Pat. No. 3,434,227 issued to T. C. Brown, Jr. is directed to a color selective book having a plurality of sheets mounted on top of one another with each sheet having a front portion with a plurality of printing ink sample areas with screened reductions thereof and at least one folded over portion with each printing ink area divided by perforations into removable clip-on "samples." The plurality of sheets are mounted so that the lower sheets project laterally outwardly beyond the other ones for simultaneous display of all printed ink colors.

U.S. Pat. No. 1,057,546 issued to H. S. Griffin is directed to the use of two boards or sheets which are superposed and movable in relation to one another. The lower board is preferably stationary with the other one movable. The lower board has a number of spots of colors arranged in rows upon its upper face, e.g., the upper row has different shades of olive, the second row has shades of green, the third row has shades of orange, etc. The upper board is smaller than the lower board and has perforations edged with colors to permit the user to see the colors on the lower board in comparison with the edging colors around the perforations.

U.S. Pat. No. 1,564,743 issued to H. H. Adler is directed to a means to determine color combinations wherein the colors are arranged horizontally and vertically in rectangular areas on the chart and includes a mask having, e.g., three horizontally spaced openings which is used to select harmonious colors or tints of colors based on a musical scale coordination which uses major and minor chords and variations thereof. The Adler invention would seem to be very complicated to consumers not having a background in music and would seem to require a knowledge of music and musical notation, chords, notes, etc., in order to use the Adler chart.

U.S. Pat. No. 1,630,247 also issued to H. H. Adler is apparently viewed by the inventor to be an improved chart/mask arrangement compared to that of U.S. Pat. No. 1,564,743 discussed above. In Adler U.S. Pat. No. 1,630,247 the mask openings are diagonally arranged to reveal only colors harmonizing with the target color sought to be harmonized. This patent also uses an analogous relationship to a musical scale with major and minor chords and variations. It is clearly apparent that both of these Adler patents are far more complicated than the color matching card set of the present invention.

U.S. Pat. No. 1,871,078 issued to B. Nash is directed to a color matching apparatus comprising a plurality of charts, e.g., two or three, each having a predominating color with transparent areas overlaying on a similar chart(s) to give the user a super imposed comparison of how a plurality of different predominant colors will look when combined, e.g., in floor tiles, for simultaneous inspection.

U.S. Pat. No. 2,858,624 issued to I. C. Bowman is directed to a hexagonal color selector chart having a plurality of radial lines (15,16) dividing it into an angular series of twelve segmented zones, spaced 30 degrees apart. A plurality of masks, e.g., seven (40) to (46) having trapezoidal windows fit within ribs (12) and each mask can assume six angular positions when rotated. The masks, although separable from one another, are interchangeable.

BRIEF DESCRIPTION OF THE DRAWINGS

FIGS. 5-12, respectively, are top plan views of each of the eight major color sheets referred to above. Each such sheet contains thirty-two different, readily discernible and distinct shades of each of these eight major colors or color groups.

DETAILED DESCRIPTION OF THE INVENTION

Figure 1:
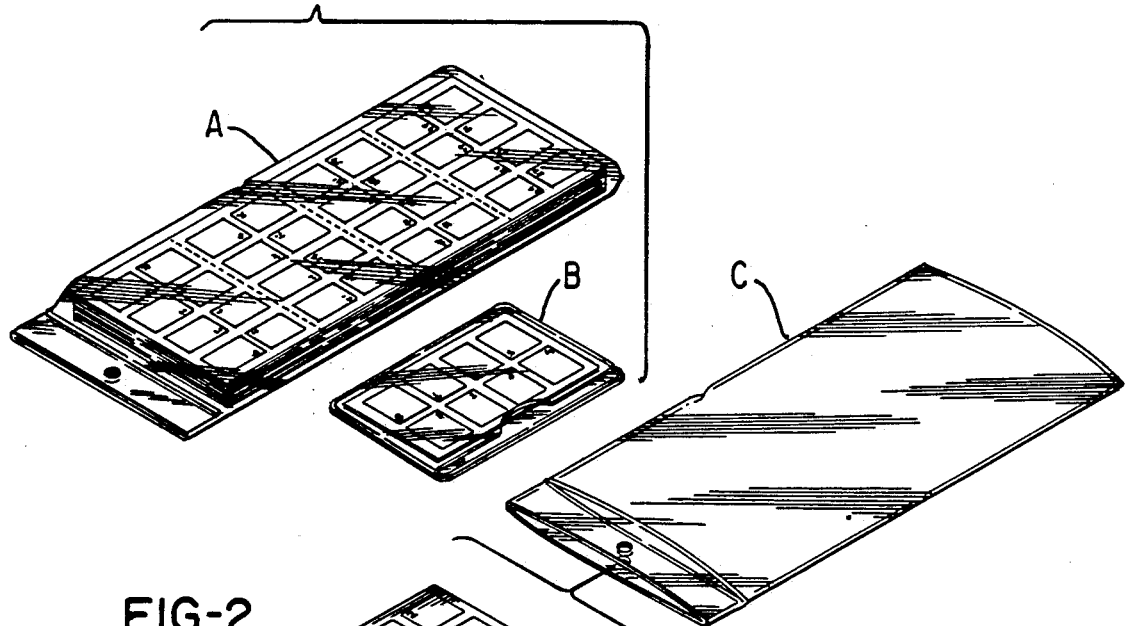
FIG. 1 is a perspective view of the enclosed consumer color reference kit of this invention with the major sheets being enclosed in a container and a business card holder permitting ready visualization of the color specimens listed on a minor card(s).

As will be noticed from FIG. 1 at A, the enclosed consumer color reference kit with clear or transparent plastic protective readily openable and closable container of sufficient size and shape to enclose all the color sheets is shown at A, and at B is shown an enclosed minor color card or cards within a transparent, clear plastic container(s), e.g., a business card holder.

Figure 2:
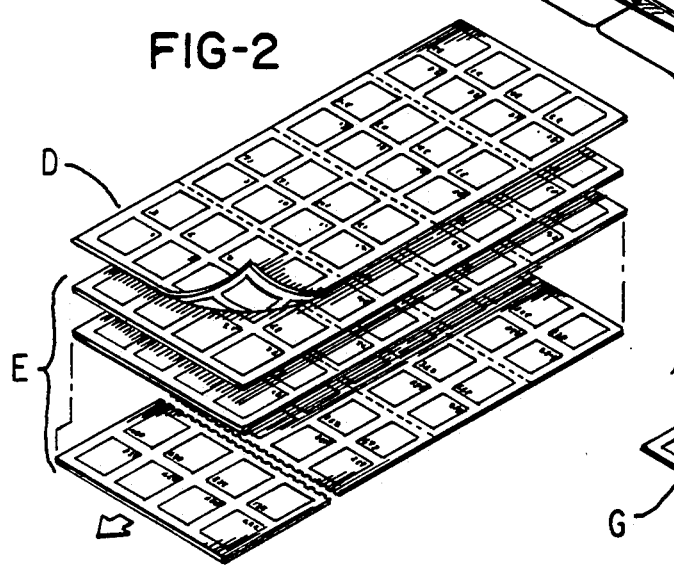
FIG. 2 is a schematic view with isometric separation of the various major sheets included within the readily resealable container.

As will be observed from FIG. 2, the overall plastic, clear envelope or container C encompasses the primary major sheet D with the corresponding secondary major sheets collectively referred to at E.

Figure 3:
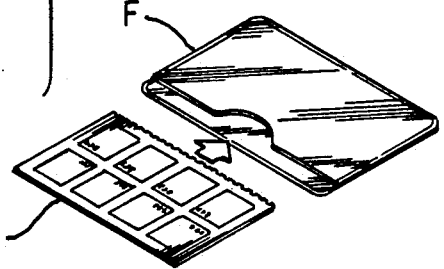
FIG. 3 is a perspective view showing a perforated minor card in position for insertion within the business card-type holder.

As will be observed from FIG. 3, a clear, transparent plastic minor card holder F of sufficient size and shape to enclose one or more minor color cards is located adjacent to the minor color card G with the perforation noted between the arrow base and the open portion of container of F.

Figure 4:
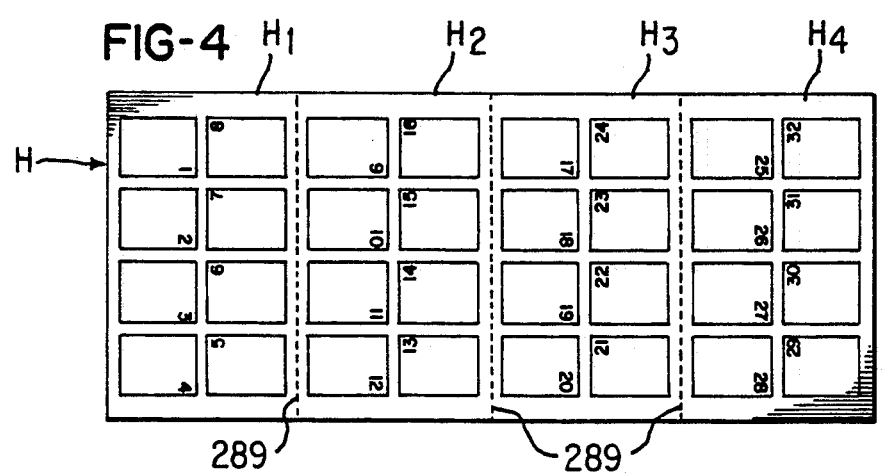
FIG. 4 is a top plan view illustrating four shades of eight major colors on the primary major sheet.

FIG. 4 of the drawings shows primary major sheet H having the four perforated sections $H_1$, $H_2$, $H_3$ and $H_4$ which represent primary minor cards each containing four tints/colors of two different major colors or color groups. These respective shades/tints of the proper major colors are further differentiated from one another by use of indicia, e.g., numbers. For example, the numbers 1–4 can be used to indicate different tints of red. The numbers 5–8 can be used to indicate different shades of orange. The numbers 9–12 can represent different shades of yellow. Numbers 13–16 can indicate different tints of green. Numbers 17–20 can distinguish different shades of blue whereas numbers 21–24 differentiate between four shades of purple. Numbers 25–28 can indicate different shades of brown and numbers 29–32 can be applied to respectively different gray tints.

Whereas FIG. 4 has illustrated four different tints/shades each, respectively, of each of the eight major colors/color groups discussed herein above, viz., red, orange, yellow, green, blue, purple, brown and gray, the remaining eight figures, viz., FIGS. 5, 6, 7, 8, 9, 10, 11, and 12, respectively, each depict thirty-two different, distinct, and readily visually discernible shades/tints of each of these respective major colors/color groups. $H_1$ through $H_4$ represent the four minor cards of primary major color sheet H.

Thus FIG. 5 respectively depicts, for example, thirty-two different and respectively distinct and readily discernible shades/tints of the major color red, viz., as indicated in the respective thirty-two numbered color specimens 33–64. Red major color sheet I contains four readily dividable minor color cards $I_1$ through $I_4$.

FIG. 6 indicates, respectively, thirty-two different, readily visually discernible and distinct shades/tints, each of which are respectively designated by the reference numerals 65–96. Orange secondary color sheet J has four readily dividable minor color cards $J_1$ through $J_4$.

FIG. 7 is a top plan view representing, respectively, thirty-two different, distinct and readily visually discernible color specimens numbered 97–128 and distinguishing various tints/shades of the color yellow. As is the case in FIGS. 1–12, separation means, e.g., scoring or perforation lines 289 divide each major color sheet into four minor color cards simply by tearing along the three respective perforation lines on each major sheet. Yellow secondary color sheet K has four readily dividable minor color cards $K_1$ through $K_4$.

As will be noted from FIG. 8, perforations 289 divide secondary major color sheet L into the four respective minor color cards L₁ through L₄. This secondary color sheet has 32 distinct and readily visually discernible shades of green as indicated by numbers 129-160.

Figures 9, 10, 11, 12:
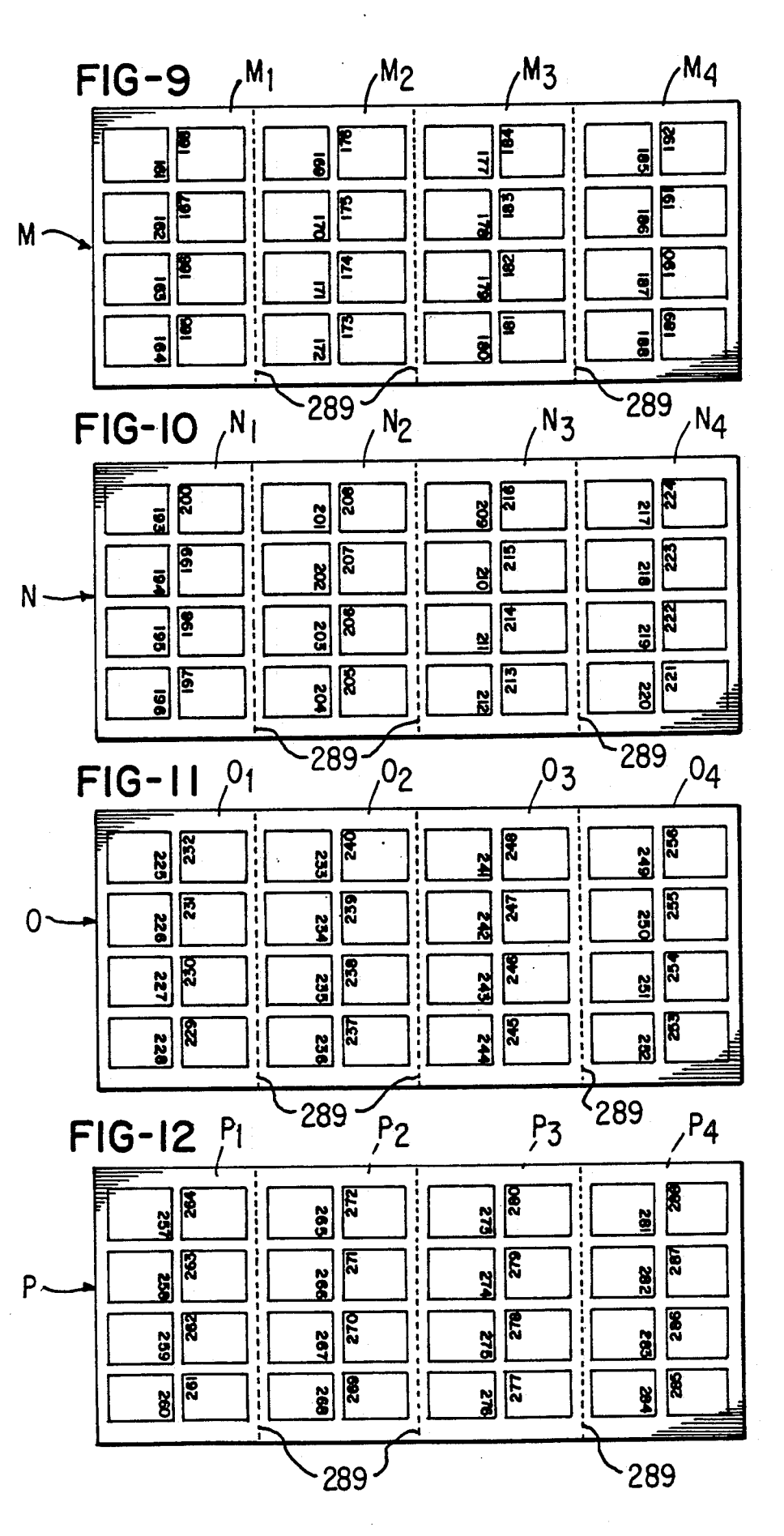

FIG. 9 depicts secondary major color sheet M having minor cards M₁ through M₄ with thirty-two, different, distinct and readily visually distinguishable shades of blue numbered 161 through 192.

FIG. 10 represents thirty-two different, distinct and readily visually discernible shades of the color purple as are indicated by numbers 193-224 on the four minor card portions N₁ through N₄ of secondary major color sheet N.

FIG. 11 illustrates thirty-two different, distinct and readily visually discernible shades/tints of the color brown indicated by the respective numerical designations 225 through 256 of secondary major color sheet O with its minor card portions O₁ through O₄.

Finally, thirty-two different, distinct and readily visually discernible shades/tints of the color gray are respectively seen in minor card sections P₁ through P₄ of secondary major color sheet P as indicated by reference numbers 257 through 288, respectively.

In performing a color match or compatible coordination using the consumer color reference kit of this invention, the consumer first uses the primary major color sheet H and selects the minor card portion thereof H₁ through H₄ more closely visually resembling the tint/shade desired to be matched of the item desired to be matched/coordinated. This indicates to the consumer which of the eight secondary major color sheets to refer to in the second visual comparison step.

Then having selected one of these secondary major color sheets I through P, respectively, the consumer makes his/her second visual comparison by selecting one of the four minor cards on the secondary major color sheet. This card is then torn along its perforation lines 289.

Finally, the consumer performs the final (at home) visual comparison and selects the one of the eight shades/tints most closely matching the shade/tint desired and notes its respective number or other indicia.

If the consumer is making the visual match/coordination personally, he/she takes the selected secondary minor card to the other location to do the in-store selection by visually comparing the previously selected numbered shade/tint with the various prospective candidate articles for purchasing to select the one most closely matching, or coordinating, with the item at home.

If the final visual color comparison is to be made by someone other than the consumer purchaser, he/she communicates to the store clerk or other in-store item selector the specific number of the previously selected shade/tint sough to be matched and the item selector locates that shade/tint in his/her corresponding consumer color reference kit and uses it as the basis for item selection by visual comparison.

Thus there has been described an inexpensive, highly portable, simple to use, consumer color reference kit which enables the consumer to match or coordinate closely and compatibly the color/shade/tint of an item located at one place, for example, at home, with that of another item located elsewhere, e.g., in a department store, simply by using the several simple visual color comparisons afforded by the primary major color sheet with each respective minor card thereof in conjunction with the secondary major color sheets with their respective minor cards. It will be remembered that the present invention offers the user a wide spectrum of approximately 288 shades/tints of colors in both glossy and matte finishes.

While the present drawings illustrate only one surface for each color specimen of the major sheets of FIGS. 4 through 12, inclusive, it should be remembered that for each color specimen represented in the drawing there is another color specimen on the respective corresponding other side in its reverse position to present the respectively different glossy and matte surfaces of each respective color shade/tint. In essence, then, the present invention offers, but is not necessarily limited to, 576 variations of color appearance when one considers both glossy and matte finishes. However, the only comparison card which the user need carry to the store or communicate color choice to another for the final color comparison step for each item desired to be purchased is a single secondary minor card bearing eight differentiating indicia, one of which pinpoints the proper selected matching or compatible shade/tint. This card is approximately the size of a business card and can be readily contained within a clear, transparent plastic card holder F as indicated in FIG. 3.

The respective differentiation between the shades/tints of color on each of the secondary major sheets has been obtained by computerized scanning of printing ink colors so as to differentiate on a regular colorimetric basis the respective tints/shades of color of each respective primary color, viz., the eight respective primary colors set forth hereinabove. This regular differentiation and reproduction by computerized scanning of these eight primary colors is in accordance with known technology and need not be repeated specifically herein.

While the present disclosure has centered on the use of thirty-two respective different, distinct and readily visually discernible/distinguishable shades/tints of the eight major colors/color groups (red, orange, yellow, green, blue, purple, brown and gray), it should be understood that the present consumer color reference kit is not necessarily limited thereto. Thus more or less than 32 shades/tints of each of these major colors/color groups can be contained on each secondary color sheet I through P. Similarly, more or less than four readily dividable minor cards can be contained in each secondary color sheet within the purview of this invention.

In substance this color reference kit is characterized as being based on the four basic known process printing colors, magenta, yellow, cyan and black and containing a primary color sheet having a first plurality of different, distinct and readily visually discernible/distinguishable shades/tints of the major colors/color groups: red, orange, yellow, green, blue, purple, brown and gray; and eight secondary major color sheets each having a second and greater plurality of different, distinct and readily visually discernible/distinguishable shades/tints of each said major colors/color groups; wherein each color sheet (primary and secondary) is readily dividable into a plurality of minor color cards.

What is claimed is:

1. A consumer color reference kit based on the four basic known processing printing colors, magenta, yellow, cyan and black, and containing a primary color sheet having a first plurality of different, distinct and readily visually discernible shades of major colors: red, orange, yellow, green, blue, purple, brown and gray, and eight secondary major color sheets, each having a second and greater plurality of different, distinct and readily visually discernible shades of one of said major colors, wherein each primary and secondary color sheet is readily separable into a plurality of minor color cards.

2. A consumer color reference kit as in claim 1 wherein perforations divide each said color sheet into minor color cards.

3. A consumer color reference kit as in claim 1 wherein each minor color card of said primary color sheet contains a plurality of major colors.

4. A consumer color reference kit as in claim 1 wherein each primary and secondary color sheet has glossy color specimens on one side and matte color specimens of the same shade on the other side thereof.

5. A consumer color reference kit as in claim 1 which includes a readily openable and closeable, clear plastic container of sufficient size and shape to enclose said primary and secondary color sheets.

6. A consumer color reference kit as in claim 1 including a clear plastic container of sufficient size and shape to enclose one or more minor color cards.

7. A consumer color reference kit as in claim 1 wherein each secondary major color sheet has 32 different, distinct and readily visually discernible shades of one of said major colors.

8. A consumer color reference kit as in claim 1 wherein each secondary color sheet includes four minor color cards.

9. A consumer color reference kit as in claim 1 wherein said primary color sheet includes eight minor color cards, each of which has four different, distinct and readily visually discernible shades of each of said major colors.

10. A consumer color reference kit as in claim 1 wherein each different, distinct and readily visually discernible shade has its own respective associated indicia.

11. A consumer color reference kit based on the four known process printing colors, magenta, yellow, cyan and black and containing a primary color sheet having a first plurality of different, distinct and readily visually discernible shades of major colors: red, orange, yellow, green, blue, purple, brown and gray, eight secondary major color sheets, each having a second and greater plurality of different, distinct and readily visually discernible shades of one of said major colors, separation means providing for separating each primary and secondary color sheet into minor color cards, and wherein each primary and secondary color sheet has glossy color specimens on one side and matte color specimens of the same shade on the other side thereof, and including a readily openable and closeable, clear plastic container of sufficient size and shape to enclose said primary and secondary color sheets and a clear plastic container of sufficient size and shape to enclose one or more minor color cards.

* * * * *

UNITED STATES PATENT AND TRADEMARK OFFICE
CERTIFICATE OF CORRECTION

PATENT NO. : 4,992,050
DATED : February 12, 1991
INVENTOR(S) : Diane M. Edwards

It is certified that error appears in the above-indentified patent and that said Letters Patent is hereby corrected as shown below:

Title page, item [76], change inventor's address to:

--14155 Crystal Creek Drive
Strongsville, Ohio 44136--

ABSTRACT, fifth line "mirror" should be --minor--

ABSTRACT, twentieth line "speciment" should be --specimen--

ABSTRACT, twenty-sixth line "sealbe" should be --sealable--

Column 5, line 55, "sough" should be --sought--

Signed and Sealed this

Fifth Day of October, 1993

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 4,992,050
DATED : February 12, 1991
INVENTOR(S) : Diane M. Edwards

It is certified that error appears in the above-indentified patent and that said Letters Patent is hereby corrected as shown below:

On the title page, the inventor's address is:

--14155 Crystal Creek Drive
Strongsville, Ohio 44136--

On the title page: ABSTRACT, fifth line "mirror" should be --minor--

On the title page: ABSTRACT, twentieth line "speciment" should be --specimen--

On the title page: ABSTRACT, twenty-sixth line "sealbe" should be --sealable--

Column 5, line 55, "sough" should be --sought--

Signed and Sealed this

Twenty-sixth Day of October, 1993

Attest:

BRUCE LEHMAN

Attesting Officer                Commissioner of Patents and Trademarks